June 17, 1930.  A. MARTIN  1,765,086
MEANS FOR ORNAMENTING FOOD STUFFS
Filed Sept. 5, 1929
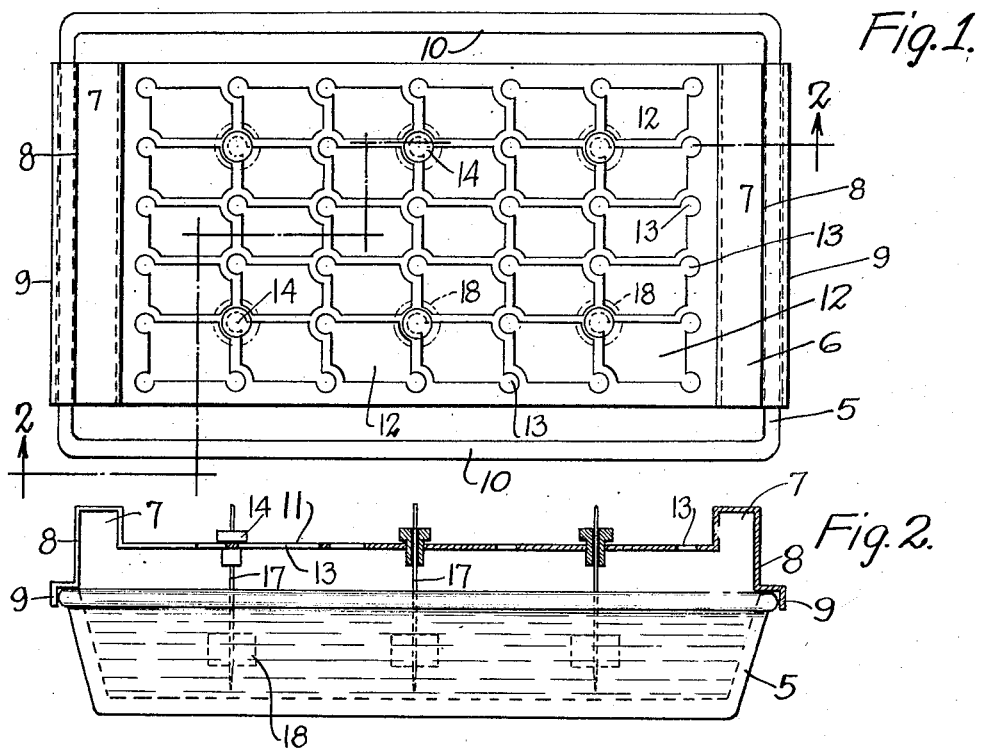
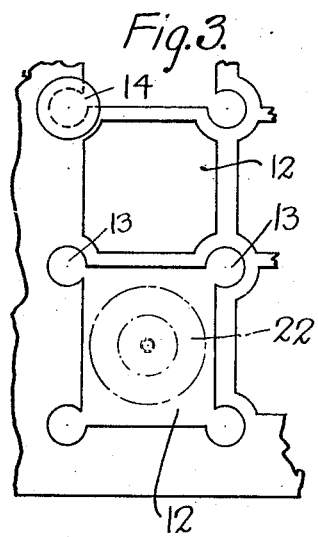
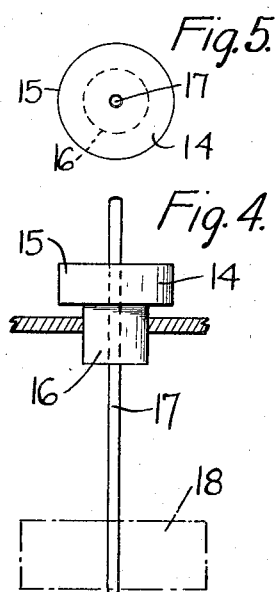
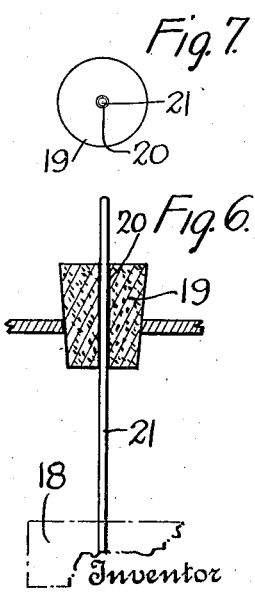
Inventor
ALBERT MARTIN
By His Attorney
John J. Lynch Patented June 17, 1930

1,765,086

UNITED STATES PATENT OFFICE

ALBERT MARTIN, OF NEW YORK, N. Y.

MEANS FOR ORNAMENTING FOODSTUFFS

Application filed September 5, 1929. Serial No. 390,635.

This invention relates to a method for ornamenting food stuff and to the means for carrying out such ornamentation.

A particular object of the invention is to provide a method and means for carrying out the ornamentation by providing a container in which cake, jelly, ice cream, candy or other edibles are formed in a particular shape and have embedded therein ornamental substances made from food stuff which are arranged to be left embedded in the food stuff after the same has been completely prepared.

A further particular object of my invention is to provide a means whereby the ornamentation of the food stuff may be carried out quickly and efficiently, the ornamentation members being suspended vertically and being supported through the medium of a bridge member having openings therein which facilitate the placing of the ornamentation members whereby they may be placed into the food stuffs to be molded, in large quantities and very rapidly so that the cost to the consumer is reduced to a minimum.

To enable others skilled in the art to fully comprehend the underlying features of my invention that they may embody the same in various modifications in structure and relation contemplated, a drawing depicting a preferred form has been annexed as a part of this disclosure and in such drawing similar reference characters denote corresponding parts throughout all of the views, of which;

Figure 1 is a plan view of a baking pan or mold over the top of which is snapped my improved bridge member which carries the ornament holding means so that the ornamentations are properly suspended therefrom.

Figure 2 is a section taken on the line 2—2 of Figure 1 and shows the shape of the bridge and its shape in association with the mold or baking pan.

Figure 3 is a fragmentary view of one corner of a bridge in which the openings have been provided in slightly different arrangement than that illustrated in Figure 1.

Figure 4 is a view in elevation of a pin holder which is arranged to fit within the openings in the bridge, the pin carried by the holder being arranged to support vertically the member used for ornamentation.

Figure 5 is a top plan view of the pin holding member illustrated in Figure 4.

Figure 6 is a view in sectional elevation of a different form of pin holding member, and Figure 7 is a top plan view of the pin holding member illustrated in Figure 6.

Referring to the drawing in detail 5 indicates a container which may be made of glass, metal or any other suitable material and in which is adapted to be prepared a food stuff, it being an object of my invention as carried out in my Patent No. 1,624,670 granted to me on April 12th, 1927 and No. 1,710,369 granted to me on April 23rd, 1929, to provide a means for ornamenting food stuffs by embedding within the food stuff an ornamental member preparatory to completing the food stuff either by cooking, freezing or the like and as an improvement over the pin holding member of the patents referred to, I provide a bridge member 6 the ends of which are arranged to provide a raised portion 7, a depending apron 8 and an offset flange 9, the latter through the medium of the flexible nature of the apron 8 being arranged to snap over and seat on the edges of the container 5 so that the bridge 6 is retained in position in spaced relation with the side edges 10 of the container 5. This bridge is preferably made of metal and its central depressed portion 11 is formed to provide a series of relatively large openings 12 off of which opens the smaller cut out or opening 13.

In the manufacture of my improved bridge the same may be punched and bent in a punch and die operation so that all of the small openings 13 and the large openings 12 are of uniform size. In my previous patents referred to some of the ornamentation members have been held on horizontally disposed pin members and in order to support the food stuff that is used for ornamentation on a vertically disposed pin and at the same time permit the pins to be placed into the bridge or supporting member in rapid succession and without the necessity of placing the ornamentation members on the pin from the underside of the bridge as would be necessary in a bridge member employing pin sized openings, the cut out or opening 13 are arranged to receive the plug members as illustrated in Figures 4 to 7 inclusive. These plugs 14 may be provided with an enlarged finger gripper portion 15 and an extended body portion 16 the entire plug being provided with a central bore in which is frictionally held the pin 17 which carries the ornamenting member 18. The reduced or extended portion of the plug 16 is arranged to fit snugly into the opening 13 so that they will retain the pins in vertical position and prevent displacement of the ornamentation members when the food stuff is poured in around these members preparatory to making up the completed material.

The material from which the plugs are made may be of rubber, cork, wood or the like and in Figure 7 I have shown the use of a cork plug 19 which is provided with a central pin receiving bore 20 in which the pin 21 is frictionally held, the pin as before supporting in vertical relation the ornamenting member 18. This plug 19 is arranged to be forced into the opening 13 so that the ornamenting member may be positioned properly.

It will be evident that in a plate in which pin receiving openings are provided it would be necessary to remove all of the pins in order to position thereon the ornamenting members and in order that the pins may have impaled thereon these ornamenting members before they are placed into a supporting member, the large opening 12 in the bridge have been provided and it is quite evident as indicated in outline in Figure 3 and denoted by the numeral 22 that quite a large ornamentation member can be inserted through the opening 12, and the plug in which the pin is positioned that carries the ornamenting member, may then be placed in the opening 13.

It will be noted that one or more of the openings 13 may open into the larger opening 12 as illustrated in Figure 1 but this arrangement may be varied as illustrated in Figure 3 in which an opening 13 may be provided at each corner of the larger opening 12 or any arrangement of smaller openings may be provided in conjunction with the larger opening to facilitate the work of placing the ornamentation members in position.

It will be noted by referring to Figure 2 that the ends of the bridge in their raised portions 7 which are above the plane of the body portion 11 of the bridge, provide a barrier that prevents spillage over the ends of the bridge of the material with which the form or container 5 is being filled. Also the spacing of the sides of the bridge from the side walls of the container permits the filling liquid to run over the bridge and into the container 5 after the ornamenting members have been placed in position.

It is evident therefore that when the contents of the receptacle 5 has been baked, frozen or otherwise prepared, the entire bridge may be snapped off the upper edge of the receptacle 5 and will carry with it all of the pins 17, leaving the ornamenting members 18 embedded in the body of the food stuffs in the container 5, the pins 17 being frictionally held within the plug members may be removed individually if desired but in quantity production the removal of the bridge facilitates the removal of the pins and all of the pins may be drawn vertically out of the food stuff without damaging the same.

It is also evident that my improved construction may be applied to pans of any shape or size and the particular cut outs may be of any desired shape and the ornamenting members may be of any size or configuration depending upon the food stuff to be ornamented.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of invention or the scope of the appended claims.

Having thus described my invention what I claim as new and desire to secure by United States Letters Patent is:—

1. The combination with a container of a bridge having relatively small and large openings therein and some of said openings being arranged to receive plugs.

2. The combination with a container of a bridge having intercommunicating, relatively large and small openings therein, and some of said openings having plugs and ornament carrying members positioned in said plugs.

3. The combination with a container, of a bridge having large and small openings therein, plugs carried by the bridge in said small openings, and pins held in vertical position by said plugs.

4. A means for ornamenting food stuffs comprising a receptacle, a bridge arranged to snap on said receptacle, and having openings therein, and ornament holding members positioned in some of said openings.

5. A means for ornamenting food stuffs comprising a receptacle, a bridge supported on the receptacle, having relatively large and small openings therein, pins for carrying ornamentation elements, plugs through which said pins pass, and said plugs being releasably positioned in said small openings.

6. A means for ornamenting food stuffs comprising a receptacle, a bridge releasably supported on the receptacle, having relatively large and small intercommunicating openings therein, pins for carrying ornamentation elements, plugs through which the pins pass and such plugs being releasably positioned in said small openings.

7. A means for ornamenting food stuffs comprising a receptacle, a bridge supported on the receptacle in space relation with the size thereof, raised portions at the ends of said bridge, the bridge being provided with openings, plugs in some of the openings, and ornament carrying pins in said plugs.

8. In a device of the character described, a receptacle, a bridge member having relatively large and small intercommunicating openings therein, pin carrying plugs, such small openings constituting plug receptacles, and said large openings permitting passage into the receptacle of an ornamenting member supported on the pin.

In testimony whereof I have signed my name to this specification this 29th day of August, 1929.

ALBERT MARTIN. [L. S.]